L. W. FROMM.
MOLD FOR ARTIFICIAL REPAIR TEETH.
APPLICATION FILED JULY 13, 1916.

1,282,210.

Patented Oct. 22, 1918.

WITNESSES
Edw. Thorpe
J. B. Larsen

INVENTOR
L. W. Fromm
BY
ATTORNEYS

UNITED STATES PATENT OFFICE.

LUTHER W. FROMM, OF NOME, TERRITORY OF ALASKA.

MOLD FOR ARTIFICIAL REPAIR-TEETH.

1,282,210.  Specification of Letters Patent.  Patented Oct. 22, 1918.

Application filed July 13, 1916. Serial No. 109,065.

*To all whom it may concern:*

Be it known that I, LUTHER W. FROMM, a citizen of the United States, and resident of Nome, in the Territory of Alaska, have invented a new and Improved Mold for Artificial Repair-Teeth, of which the following is a full, clear, and exact description.

My invention relates to molds for forming artificial teeth, and has for its object the provision of means in such a mold for forming in the back of the tooth-member a cavity or recess of desired shape and, within limitations fixed by the dimensions of the tooth member, of any predetermined disposition relative to the said member.

The tooth-member, for the manufacture of which it is the object of my present invention to provide means, is fully specified in another application for United States Letters Patent made by me.

For present purposes it may be briefly described as one in which a cavity or recess, preferably provided with undercut side walls is relatively so disposed in the tooth member as to adapt it to take in the stumps of pins which are embodied in tooth-fronts of general use in the art, and which are left protruding from the metallic backing of a bridge, crown, or plate whenever a tooth-front thereof is broken away from it. Such pins are employed in pairs, the relative disposition of the pins composing each pair to the tooth in which they are embodied and to each other being uncertain and variable. Consequently in order to provide, in a standardized line of manufacture of repair teeth, a cavity or recess for each tooth-front of minimized dimensions, calculated for use in repair work to receive a pair of pin stumps, it is desirable, in order to avoid the necessity of a separate mold for each tooth, to provide in one mold an adjustable member for forming said cavity or recess, whereby the same mold may be used to great economical advantage for the manufacture of a range of tooth-fronts of practically unlimited extent.

What constitutes my present invention will be hereinafter specified in detail and succinctly set forth in the appended claims.

In the accompanying drawing wherein I illustrate my invention in one simple form of embodiment, Figure 1 shows, each in plan view, the exposed faces of a pair of juxtaposed mold members, partially broken away.

Figure 2:
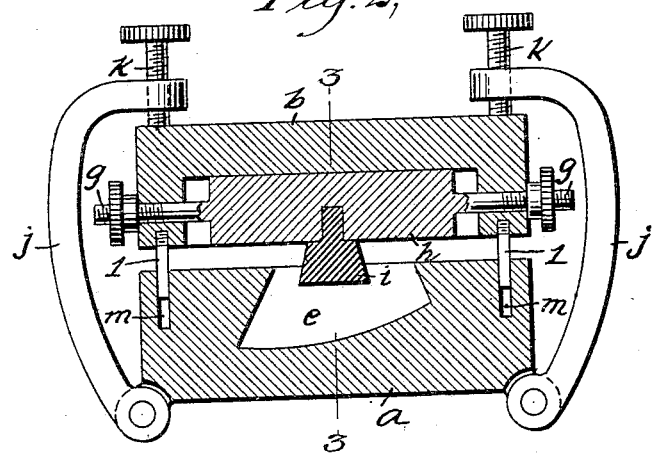
Fig. 2 shows, as in vertical section along the line 2—2 of Fig. 1, the two mold members, as shown in the former figure, conjoined, with their faces juxtaposed, as in use.
Figure 3:
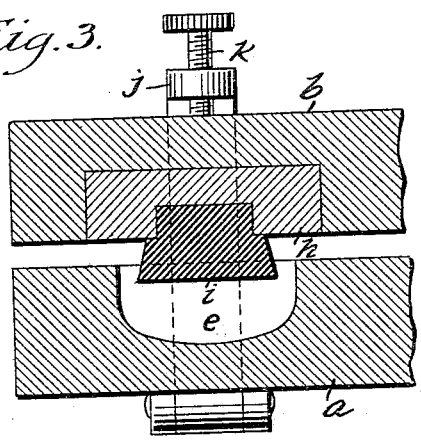
Fig. 3 is a vertical section as on the line 3—3 of Fig. 2.

Referring to the characters on the drawing, *a* indicates one of a pair of mold members and *b* the other. They are provided with clamping bows *j*, that are hinged to one member, for example, as shown the member *a*. When juxtaposed as shown in Figs. 2 and 3 the two members are adapted to be forcibly driven toward each other as by the aid of screws *k*, one being provided in each free end of the respective bows *j*. The bows and their parts appurtenant are only representative of compressing mechanism adapted for the purpose of driving the members *a* and *b* together, and may be varied at will.

Either one of the mold-members, for example *a*, is provided with a shaping recess *e* that is made to impart the shape desired to a tooth-front. The shape of it shown in the drawing is presented from selection at random, and is varied according to the tooth-front, it is desired to make.

The complementary mold member, *b* for example, to correspond with the one above named, is provided with a recess into which fits a countersunk block *h*. The block is of smaller dimension in one way than the recess which receives it, whereby adjustment of the block within its recess may be made. Such adjustment may be made and fixed by aid of any suitable mechanism, preferably consisting of studs *g* projecting from its opposite ends, respectively, through apertures provided for their reception in the end walls of the recess formed of the member *b*. Thumb nuts threaded to the projecting ends of said studs afford the means of adjustment and when both are jammed against the outside walls of the member *b* serve to secure the block *h* solidly within the recess.

In the face of the block *h*, I provide a mold core *i*, that is preferably provided with a reduced shank seated into a socket in the block, so that the core is rendered easily removable and thereby made interchangeable with cores of different shapes, at will. The core is preferably made of graphite or other heat-resisting material which after being, in the usual manner, baked in the material of which the tooth-front is made, such for example as a procelain composition, may be readily crumbled and removed. The use of graphite or the like is important if the walls of the core are inwardly inclined as illustrated, since such a core will shape an undercut cavity in a tooth-front. Otherwise it will be convenient to make the core of metal.

Dowel pins 1, in one mold member registering with sockets m in the other may be used for insuring accurate alinement of the mold members in their travel toward each other.

In practice a member having a desired size and contour of shaping recess $e$ is selected and likewise a core $i$ as desired. The recess, after the mold members are made ready and the position of the core $i$ fixed in required adjustment, is then supplied with a sufficient quantity of the tooth-front forming-composition in moldable form, as, for example, a powder or a paste. The mold-members are thereupon driven together or toward each other to the point desired, and in that operation the tooth-front forming composition is shaped to take form within the recess $e$ and about the core $i$.

The mold with its charge is then baked in any usual or preferred manner. In baking the mold-members may be kept united or they may be separated, as preferred, and if separated only the member having the recess $e$ is subjected to heat. The shank and socket union between the core $i$ and the block $h$ readily lends itself to the separation of the core and its mold member whenever desired.

Figure 1:
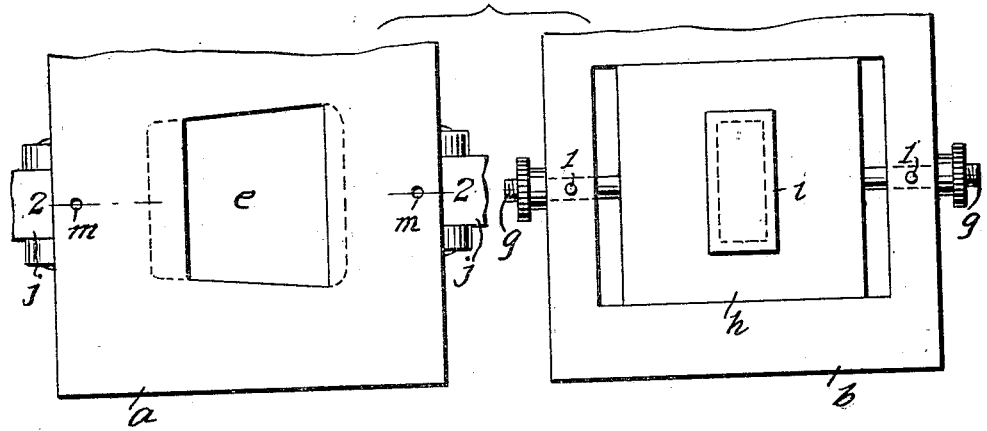

It should be observed that only the elements necessary to the completion of a single tooth-front are shown in the drawing. As indicated by the broken lines Fig. 1 and in Fig. 3 each mold-member may comprise as many blocks $i$ and recesses $e$, adapted for the molding of as many tooth-fronts at one time, as may be found convenient and desirable.

What I claim is:

1. In a two part mold for artificial teeth, the combination with one part provided with a tooth shaping recess, of the other part provided with a mold transversely adjustable to different positions relative to the said recess in the opposing member.

2. A member of a mold for artificial teeth, provided with a transversely adjustable block loosely carried within a recess in said member and adjustable means for fixing the position of the block in a vertical direction.

3. In a two part mold for artificial teeth, the combination with one part provided with a tooth shaping recess, of the other part provided with a recess, a block mounted in said last mentioned recess and adjustable to different positions therein, a mold core mounted in said block and adjustable therewith to different positions relative to the tooth shaping recess in the opposing member.

LUTHER W. FROMM.

Witnesses:
T. M. REED,
GEORGE JAMES.

Copies of this patent may be obtained for five cents each, by addressing the "Commissioner of Patents, Washington, D. C."